Nov. 10, 1931.  H. O. LINDGREN  1,831,500
PROCESS OF SEPARATING RUBBER LATEX
Filed July 2, 1928
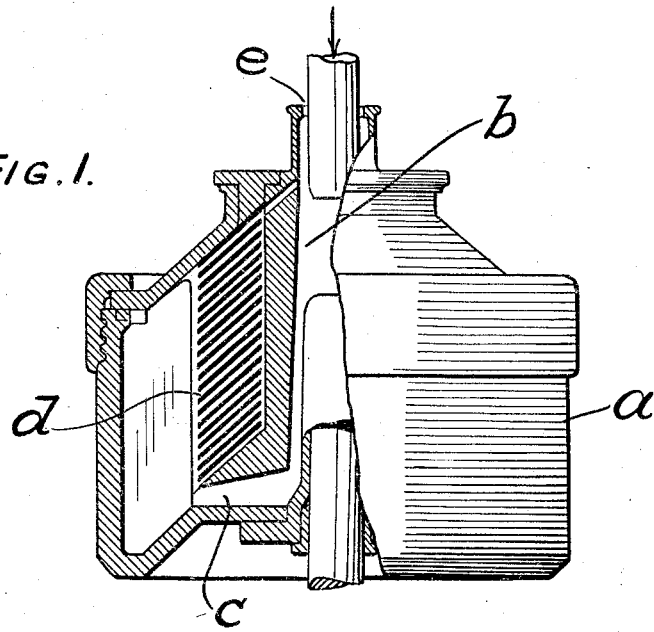
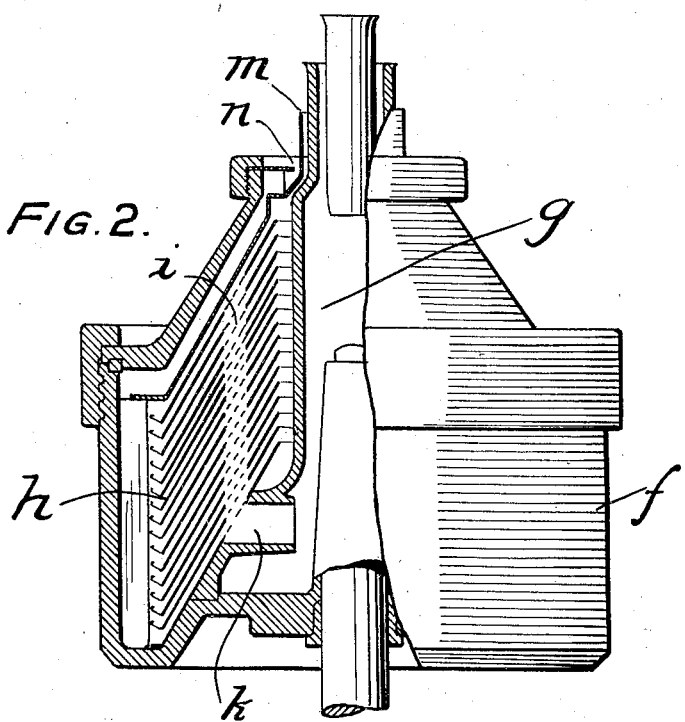
WITNESS:
INVENTOR
Hans Olof Lindgren
BY
Busser and Harding
ATTORNEYS Patented Nov. 10, 1931

1,831,500

UNITED STATES PATENT OFFICE

HANS OLOF LINDGREN, OF APPELVIKEN, SWEDEN, ASSIGNOR TO THE DE LAVAL SEPARATOR COMPANY, OF NEW YORK, N. Y., A CORPORATION OF NEW JERSEY

PROCESS OF SEPARATING RUBBER LATEX

Application filed July 2, 1928, Serial No. 289,872, and in Sweden July 12, 1927.

Rubber latex usually contains between 30 and 40 per cent. of rubber. It has been found possible, by centrifuging, to obtain, from 100 litres of rubber latex, about 50 litres of concentrate containing about 60 per cent. rubber and about 50 litres of skimmed latex containing about 10 per cent. rubber. In order to effect such separation it has been found necessary to use a separator of maximum efficiency. For this reason it is almost imperative to use separator bowls provided with conical "discs". With certain kinds of latex it has been found that the discs quickly become coated with slime, which, after a few minutes' separation, accumulates to such an extent as to substantially fill the spaces between the discs. The bowl must then be dismantled and the slime removed. It has been therefore found commercially impracticable to effect the purification of rubber latex by centrifugation.

The object of the present invention is to provide an efficient and commercially practicable centrifugal process for the purification of rubber latex that will remove the impurities and also effect the separation of the rubber latex into a concentrate of a very high degree of purity and a skimmed latex that is of a lower, but yet comparatively high, degree of purity.

The process comprises two centrifugal separating processes of different character in the first of which are removed the impurities, or the great bulk of them, including impurities that are liable to stick to the separator bowl as well as relatively non-adherent solids, and in the second of which the latex is separated into two parts one containing more, and the other containing less, rubber than in the original latex.

While the process is not dependent for its execution on the use of centrifuges of any specific construction, it is practically imperative to use centrifuges of quite different types in the two centrifugal steps of the complete process, and as illustrative of centrifuges that have been found efficient, vertical sectional views of two centrifuges are shown in the drawings: Fig. 1 being a vertical sectional view of a centrifuge in which the first step of the process may be carried out and Fig. 2 a similar view of a centrifuge in which the second step of the process may be carried out.

The centrifuge shown in Fig. 1 comprises a bowl $a$, a tubular feed shaft $b$, a passage $c$ through which the latex is admitted to the separating space of the bowl, discs $d$ sleeved on the tubular feed shaft, and a liquid outlet $e$ from the central part of the bowl.

In this centrifuge, all the latex passes through a part of the bowl which has a strong centrifugal action and, from a purifying point or view, is extremely effective. It is not necessary that the bowl should be equipped with conical discs, but it is distinctly preferred to use such discs. It is preferred, however, that the discs should extend at a wider angle to the bowl's axis than is customary in separators of this type so as to facilitate the sliding outward along the discs of such of the solid impurities as are separated out between the discs. It is preferred that the discs shall not extend out close to the periphery of the bowl, but shall extend out only so far as to leave a surrounding chamber of substantial radial dimensions. Nor need the discs, if discs are used, be positioned as close together as in the ordinary disc separator.

In this centrifuge, the solids and slime constituents are to a substantial extent separated out in the open space surrounding the discs and accumulate on the bowl wall. That part of the latex that flows between the discs $d$ has a reduced content of impurities and the remaning impurities that are removed in the constricted separating chambers between the discs slide outwardly comparatively freely along the discs and do not tend to accumulate thereon or clog the separating compartments.

The centrifuge shown in Fig. 2 comprises a bowl $f$, a tubular feed tube $g$, discs $h$ extending outward from the feed tube comparatively close to the bowl wall and provided with vertically aligning holes $i$, a passage $k$ through which the entering liquid is fed to the holes $i$, a light liquid outlet $m$ and a heavy liquid outlet $n$.

When the purified rubber latex discharged from bowl $a$ is admitted to the feed tube of the central bowl, it flows up through the disc orifices *i* and distributes itself through the separating spaces between the discs, where a separation occurs similar to that characterizing the separation from whole milk of skim milk and butter fat. The discs should extend at a comparatively small angle to the axis of rotation, they should be quite close together and should extend radially to near the periphery of the bowl. The separation that occurs therein is one of maximum efficiency. Any part of the solution that, reaching the separating spaces, flows directly inward and thence upward to the light liquid discharge *m* and that therefore escapes passing through that part of the bowl that has the maximum separating effect, cannot carry with it any substantial amount of heavy solid impurities, since these have been removed in the first separator. The result is that, of each 100 litres of rubber latex admitted to the centrifuge, there are discharged from the light liquid discharge *m* (say) 50 litres of a purified concentrate comprising (say) 60 per cent rubber and from the heavy liquid discharge *n* (say) 50 litres of a purified skimmed latex comprising (say) 10% rubber. These proportions are merely illustrative and may be controlled by regulating the comparative rate of discharge from the two outlets.

Having now fully described my invention, what I claim and desire to protect by Letters Patent is:

1. The process of purifying rubber latex and separating it into two portions each of a high degree of purity and containing, respectively, more and less rubber than in the original latex which comprises subjecting the latex to such centrifugal action as will substantially separate impurities from the latex and then subjecting the separated purified latex to such centrifugal action as will separate it into a purified latex having a relatively high rubber content and a purified latex having a relatively low rubber content.

2. The process of purifying rubber latex and separating it into two portions each of a high degree of purity containing, respectively, more and less rubber than in the original latex, which comprises feeding the latex to a relatively spacious open compartment wherein it is subjected to a relatively strong centrifugal action and then into a series of relatively constricted separating compartments, in which it is subjected to a relatively weak centrifugal action and from which the latex is delivered in a substantially purified state, and then feeding the purified latex to a number of constricted separating compartments and to loci between the zones of maximum and minimum centrifugal action and in said compartments separating purified latex having a high rubber content from purified latex having a low rubber content and continuously removing the two separated components from the loci of centrifugation.

3. The process of purifying rubber latex and separating it into two portions each of a high degree of purity and containing, respectively, more and less rubber than in the original latex which comprises subjecting the latex to such centrifugal action as will substantially separate impurities from the latex and continuously removing from the locus of separation the purified latex, and then subjecting the purified latex to such centrifugal action as will separate it into a purified latex having a relatively high rubber content and a purified latex having a relatively low rubber content.

4. The process of purifying rubber latex and separating it into two portions each of a high degree of purity containing, respectively, more and less rubber than in the original latex, which comprises subjecting the latex to such centrifugal action as will subject substantially the entire body of the latex to a relatively strong centrifugal action and remove a portion of the impurities and then to such relatively weak centrifugal action as will remove substantially the remainder of the impurities, and then subjecting the purified latex to such centrifugal action as will separate it into a purified latex having a relatively high rubber content and a purified latex having a relatively low rubber content.

In testimony of which invention, I have hereunto set my hand at Stockholm, Sweden, on this thirteenth day of June, 1928.

HANS OLOF LINDGREN.